(12) United States Patent
Wright et al.

(10) Patent No.: US 8,567,064 B1
(45) Date of Patent: Oct. 29, 2013

(54) PCA AIR HOSE TENSION STRAP

(75) Inventors: Joe W. Wright, Xenia, OH (US); Scott E. Schrinner, Jamestown, OH (US)

(73) Assignee: Twist, Inc., Jamestown, OH (US)

( * ) Notice: Subject to any disclaimer, the term of this patent is extended or adjusted under 35 U.S.C. 154(b) by 119 days.

(21) Appl. No.: 13/216,738

(22) Filed: Aug. 24, 2011

Related U.S. Application Data

(60) Provisional application No. 61/376,525, filed on Aug. 24, 2010.

(51) Int. Cl.
*F16L 31/00* (2006.01)
(52) U.S. Cl.
USPC ............... 29/890.144; 29/525.03; 285/260
(58) Field of Classification Search
USPC ......... 29/890.144, 525.03; 285/260; 138/109, 138/120
See application file for complete search history.

(56) References Cited

U.S. PATENT DOCUMENTS

| 936,566 | A | * | 10/1909 | Rosendahl | 285/331 |
|---|---|---|---|---|---|
| 1,480,702 | A | * | 1/1924 | Vogtman | 285/311 |
| 5,368,341 | A | * | 11/1994 | Larson | 285/260 |
| 5,740,846 | A | * | 4/1998 | Larson et al. | 141/382 |
| 6,443,499 | B1 | | 9/2002 | Jenum | |
| 7,222,888 | B1 | * | 5/2007 | Piety et al. | 285/260 |
| 7,946,311 | B2 | * | 5/2011 | Kolzumi et al. | 138/124 |
| 8,316,893 | B2 | * | 11/2012 | Bowman et al. | 138/110 |
| 2001/0050480 | A1 | * | 12/2001 | Gooch | 285/260 |
| 2002/0117852 | A1 | * | 8/2002 | Jenum | 285/260 |
| 2005/0046183 | A1 | * | 3/2005 | Adams et al. | 285/260 |
| 2006/0116617 | A1 | * | 6/2006 | Bradshaw | 602/23 |
| 2007/0068039 | A1 | * | 3/2007 | Nau | 36/25 R |

* cited by examiner

*Primary Examiner* — David Bryant
*Assistant Examiner* — Justin Sikorski
(74) *Attorney, Agent, or Firm* — Wood, Herron & Evans, LLP

(57) ABSTRACT

A hose section for use in a modular PCA air delivery system includes a tension strap extending approximately parallel to and away from the body of a first end of the hose section, and a receiver loop formed on the exterior of the second end that receives a part of the strap therethrough so that the strap can be folded back in the direction of the first end, and fastened to the first end thus holding the first hose section to the second hose section when either hose section is pulled.

5 Claims, 3 Drawing Sheets

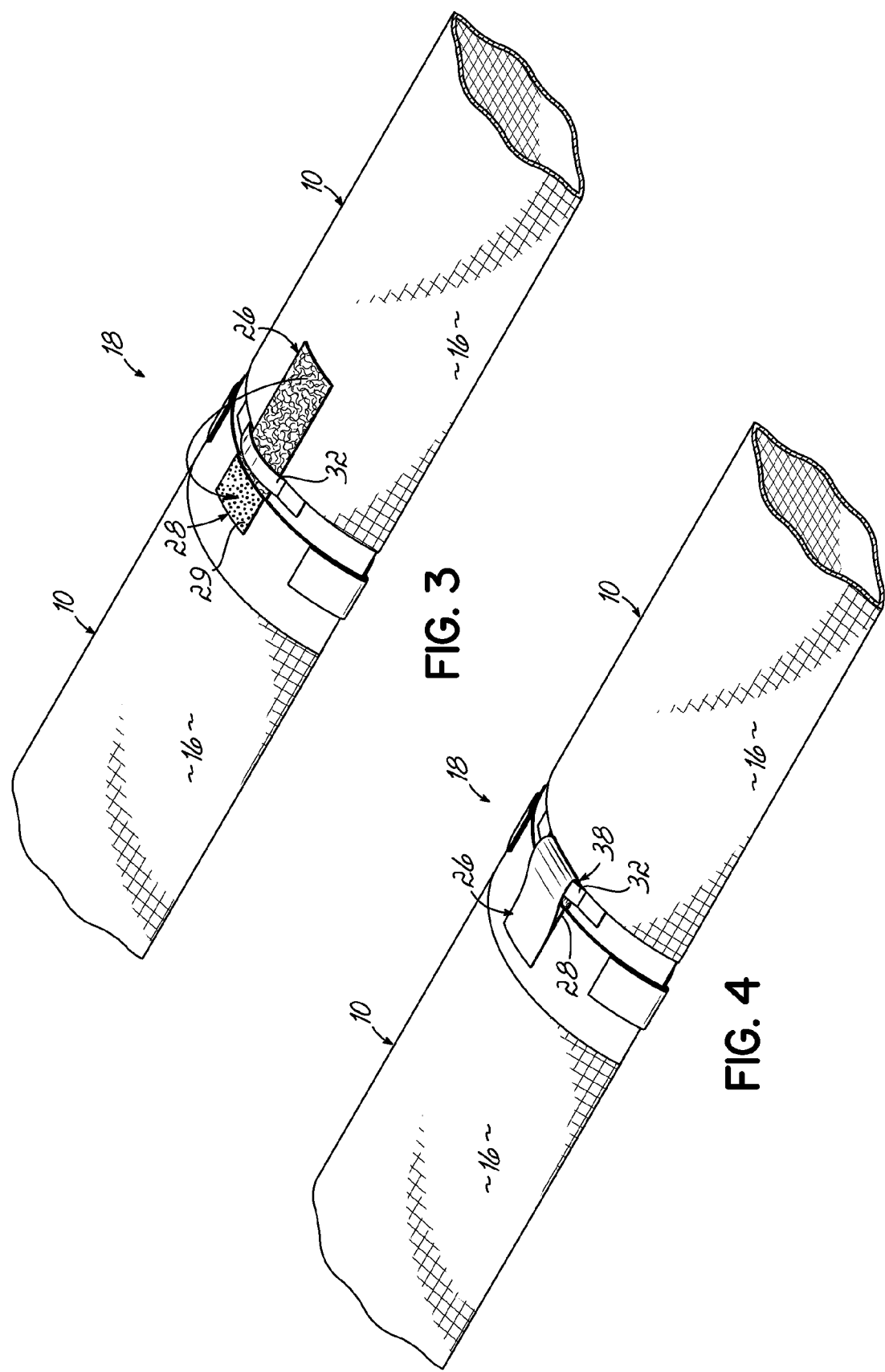

PCA AIR HOSE TENSION STRAP

RELATED APPLICATIONS

The present invention claims priority to U.S. Ser. No. 61/376,525 filed Aug. 24, 2010, the disclosure of which is hereby incorporated herein by reference in its entirety.

TECHNICAL FIELD

The present invention relates generally to low pressure large diameter air hoses, and the connections between them. One embodiment is for connecting the sections of PCA hoses used to supply air to the cabins of aircraft while parked at an airport terminal.

BACKGROUND

It is generally known to supply commercial aircraft with conditioned air for heating and cooling. Typically, conditioned air is supplied to the aircraft from a ducting system associated with the telescoping corridor that is a part of the airport terminal. The air is delivered from the telescoping corridor to the aircraft with a flexible and usually insulated air hose. The hose is typically one hundred feet in length or more. However, rarely was it manufactured in one continuous piece. It is most often made in smaller sections, for example 20 feet in length. This makes the pieces less cumbersome to manufacture and ship, and it allows different length hoses to be created on-site depending upon the expected length needed to service a particular aircraft at a particular site. Typically once sections are joined together, they are not separated again until one is damaged, or the requirements at a particular airport gate are changed. Often a hose at a particular gate is assembled to accommodate the longest reach that must be accomplished at that gate. The reach depends upon size of aircraft, parking orientation, and where on the aircraft the air hose connection is located.

The sections of hose are assembled to one another with connection systems such as zippers or Velcro so that air can pass from section to section without leakage. Examples of connection methods are found in U.S. Pat. No. 5,368,341 to Larson, that discloses a hose assembly for connecting a plurality of vinyl coated hoses with hook and loop tape fasteners. Larson employs hoses having two ends where a first end having either hooks or loops is received by a second end having the counterpart (either hooks or loops). U.S. Pat. No. 6,443,499 to Jenum is another patent regarding joining hose sections together. Instead of the end of one hose inserting into an end of the other, Jenum butts the hose ends together and, wraps the joint with an elongated outer wrap that connects to each of the two ends. In Jenum, both of the hoses may have the same (for example hooks) while the outer wrap has the counterpart (loops). Both joints aim to seal the two hose sections together so air is transported to the aircraft without leakage along the way. There are probably other ways that hose sections have been assembled together, in addition to the two examples mentioned above.

When an aircraft is not in need of the hose, the assembled hose is stored in a bin under the terminal, often with one end connected to the source of pre conditioned air, commonly referred to by its acronym PCA. When an aircraft arrives, a worker pulls the free end of the hose out to the connection point on the aircraft, dragging the hose along the ground extending it to the necessary length, and lifting one end above the ground to the height of the aircraft connection. The pulling on the hose at one end puts the hose under tension along its dragged length. That tension is transmitted from hose section to hose section through the connection that is meant to remain closed and seal the pressurized air in the hose. This puts stress on the connection, and over time the connection may at least partially loosen, allowing air to leak from the hose. The connection may come completely apart, especially in the case of hoses held together by zipper connections.

What is needed is an improved hose having features associated with the connection that prevents the tension in the hose from disrupting the seal at the connection. Preferably the features of the improved hose do not preclude any of the existing or future sealing configurations (for example, Larson or Jenum) from being used where the hoses join together. And, preferably the features may be not only used in a new variety of hose, but may also be used to modify existing varieties of hoses.

SUMMARY

A hose section for use in a modular PCA air delivery system includes a tension strap extending approximately parallel to and away from the body of a first end of the hose section, and a receiver loop formed on the exterior of the second end that receives a part of the strap therethrough so that the strap can be folded back in the direction of the first end, and fastened to the first end thus holding the first hose section to the second hose section when either hose section is pulled.

In specific embodiments, hook and loop fasteners are used to fasten the tension strap and to form an annular seal between the first and second hose sections.

Further aspects include the tension connector itself and the method of use of the hose sections with a tension connector.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 3 is a perspective view of the two ends of the embodiment of FIG. 1 engaged with one another, but not yet fastened.

FIG. 4 is a perspective view of the two ends of the embodiment of FIG. 1 engaged with one another.

DETAILED DESCRIPTION OF THE DRAWINGS

Figure 1:
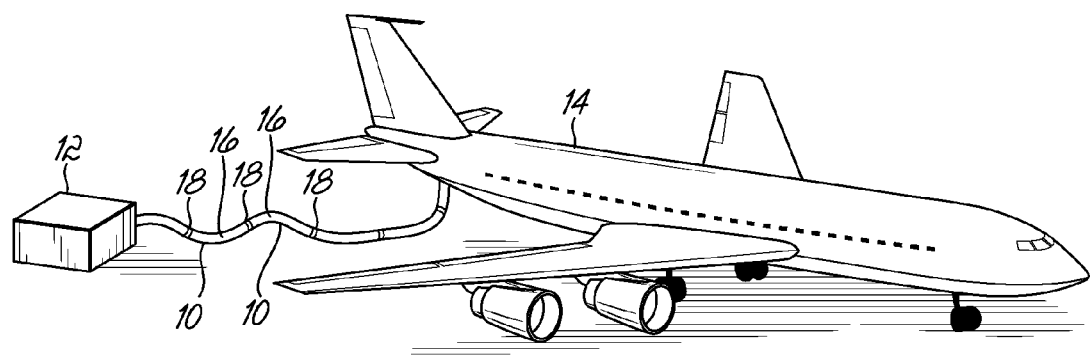
FIG. 1 is a schematic perspective view of an embodiment of the device in use, with an aircraft on the ground.

FIG. 1 illustrates an installed embodiment of the current invention. This embodiment is not meant to be limiting, but will serve as a detailed embodiment through which the advantages of the current invention are described. A series of hose sections 10 are connected to transport low pressure preconditioned air from a PCA unit 12 to an aircraft 14 on the ground, with its engines turned off. The hose sections 10 have an annular body 16 able to carry the air through the inside. The construction of the annular body 16 may be of many materials, for example vinyl or canvas, and is not a subject of the current application. The area of joining between adjacent hose sections 10 is a connection 18 that will be further described with reference to FIGS. 2 and 3.

Figure 2:
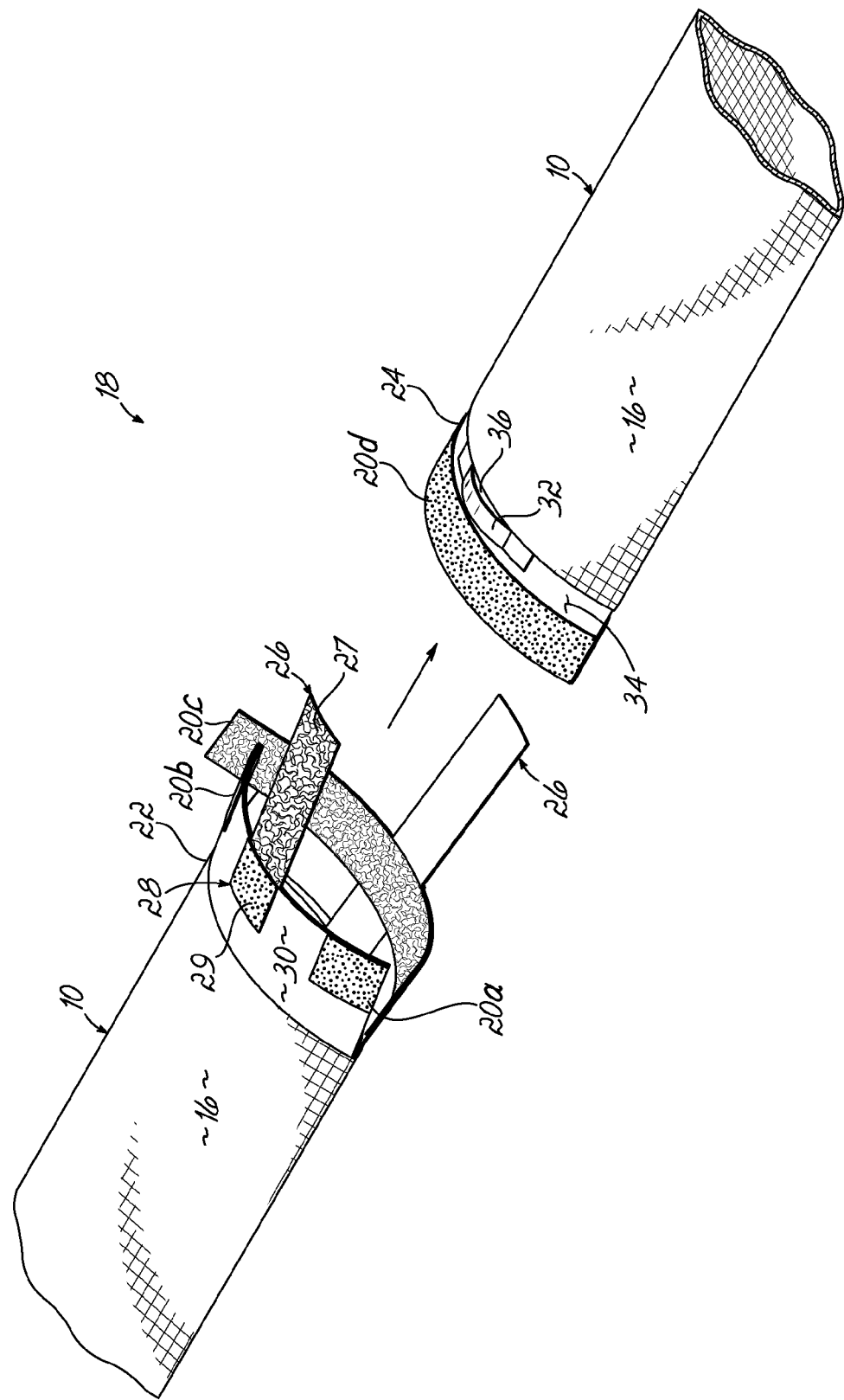
FIG. 2 is a perspective view of the two ends of the embodiment of FIG. 1, not engaged with one another.

FIG. 2 illustrates a typical air-sealing connection between adjacent hose sections 10 in accordance with principles of the present invention. The pieces of that air-sealing connection bear reference numerals 20a, 20b, 20c, and 20d. The pieces 20a-20d of the air-sealing connection are conventional and not the focus of the present application. Although the illustrated connection is exemplary, the features of the current application can work with a wide variety of air-sealing connections, as explained in the background.

The hose section 10 has a first end 22 and a second end 24, shown here as parts of adjacent hose sections 10.

In accordance with principles of the present invention, first end 22 has a tension strap 26 extending parallel to the general direction of hose section 10, and a pad 28 attached to the exterior of a cuff 30. The pad 28 may also be attached elsewhere, such as on the exterior of annular body 16. The demarcation between an annular body 16 and a cuff 30 is not a significant point, and it varies depending in the construction methods used for the hose section 10. There may not be any clear demarcation at all. Tension strap 26 has loops 27 on its surface and pad 28 has hooks 29, or the relative positions of the hooks 29 and loops 27 may be reversed. Second end 24 has a receiver 32 attached to the exterior of a cuff 34 or the annular body 16. The receiver 32 is attached so that if forms a gap 36 through which tension strap 26 can fit.

FIG. 3 illustrates the sections 10 brought together to form an air-seal connection while assembling sections to form a long hose. Tension flap 26 has been passed through receiver 32. In FIG. 4, the tension strap 26 has been folded back on itself while pulling tightly on the receiver 32 at location 38, and then attached to pad 28.

In use, when a worker drags an assembly of sections 10 to hookup to an aircraft 14, the section 10 that is gripped by the worker will pull on the next section 10, and so on. Without the tension strap 26 and receiver 32, this force would be transmitted through the air-sealing pieces 20a-20d and would be acting in a direction to separate them. With the tension strap 26, pad 28, and receiver 32 properly assembled, the tension straps transmit the force instead, so that the pieces 20a-20d are not affected at all, or are affected only a limited amount. The limited amount is the amount of slippage or flexing that would occur between the pieces 20a-20d until looseness and stretch in the tension strap 26 and receiver 32 is pulled tight enough to stop further movement. To minimize this, the height of the gap 36, and the lengths and elasticity of the tension strap 26 and the receiver 32 should be minimized. In addition, as mentioned above, the tension strap 26 should be pulled tight when the hose sections are assembled.

The foregoing embodiment has been one that describes components made of soft materials, similar to those used in other aspects of the hose. This is not only because it is often economical to use such materials, but also because the embodiment described is a PCA hose for use near aircraft 14. Areas around aircraft 14 have procedures and standards to minimize the chance that loose objects, especially rigid objects, fall unnoticed onto the tarmac, from which they can be ingested into an aircraft engine at a later time. For other hose embodiments (not shown), the tension strap 26 and receiver 32 may take on other forms, using other fasteners, and other ways to pull the adjacent hose sections tight.

Examples of other tension carrying assemblies may include plastic clips, leather belts with buckles, and seat belt components.

In addition to hose sections 10 that are typically 20 feet long, the PCA delivery system may also have a transition piece (not shown) to reduce the typical 14 inch diameter hose to the 8 inch diameter aircraft fitting. The tension strap 26, pad 28, and receiver 32 are also contemplated for use on such a transition piece.

What is claimed is:

1. A low pressure hose section comprising:
    an annular body having a first end and a second end wherein the first end of a first hose section is adapted to be sealed to the second end of a second hose section, wherein said seal between the first and second hose sections is an annular seal formed by hook and loop fasteners;
    a tension strap extending approximately parallel to and away from the annular body at the first end;
    a receiver loop formed on the exterior of the second end to receive a part of the strap therethrough so that the strap can be folded back in the direction of the first end, and fastened to the first end thus holding the first hose section to the second hose section when either hose section is pulled.

2. The hose section of claim 1 further comprising hook and loop fasteners on the tension strap.

3. The hose section of claim 1 further comprising hook and loop fasteners on the tension strap.

4. A longitudinal tension connector for a PCA air hose section comprising:
    a strap having a first end affixed to a first end of the PCA air hose section and a second end extendable from the first end of the PCA air hose section;
    a loop formed on the second end of the PCA air hose section sized to receive the strap therethrough;
    means to secure the second end of the strap to the first end of the PCA air hose section, forming a path for longitudinal tension in one air hose section to be transmitted to an adjacent air hose section so that hose sections assembled together may be dragged without imparting an unlimited separating force on air seals located between adjacent sections, wherein said air seals between the said adjacent sections are annular and formed by hook and loop fasteners.

5. A method of connecting PCA air hose sections comprising:
    extending a free end of a strap attached to a first PCA air hose section, into a loop formed in a second PCA air hose section, the loop sized to receive the strap therethrough; and
    securing the free end of the strap to the first PCA air hose section, forming a path for longitudinal tension in one air hose section to be transmitted to the other air hose section so that said hose sections assembled together may be dragged without separating air seals located between said hose sections, wherein said air seals between the said adjacent sections are annular and formed by hook and loop fasteners.

* * * * *